Jan. 18, 1966  W. S. PAPPAS ET AL  3,229,502
GAS CONDENSATION PRESSURE ANALYZER
Filed March 26, 1962  2 Sheets-Sheet 1

INVENTORS.
William S. Pappas
Charles W. Weber
BY
ATTORNEY.

INVENTORS.
William S. Pappas
Charles W. Weber
BY
ATTORNEY.

United States Patent Office 3,229,502
Patented Jan. 18, 1966

3,229,502
GAS CONDENSATION PRESSURE ANALYZER
William S. Pappas and Charles W. Weber, Oak Ridge, Tenn., assignors to the United States of America as represented by the United States Atomic Energy Commission
Filed Mar. 26, 1962, Ser. No. 183,339
4 Claims. (Cl. 73—29)

This invention relates to gas analyzer and more particularly to analyzer for continuously analyzing a stream of process gas for determining the concentration of a selected condensable component thereof.

With increased industrial handling of uranium hexafluoride, the need exists for simple, low-cost instruments to monitor and control the concentration of uranium hexafluoride in gas streams. The requirement for an instrument to accurately monitor uranium hexafluoride concentration in the presence of fluorocarbons, hydrogen fluoride, oxygen, and nitrogen has not previously been fulfilled. Because of the complexity of the gas mixtures, an analyzer not affected by gas density is desirable.

Prior art methods of determining the concentration of a condensable gas in a gas mixture may utilize any of various types of frost detectors. Such devices usually comprise a means for maintaining constant pressure, means for varying the temperature of the system and a means for determining the temperature at which condensation takes place. Numerous disadvantages inherent in systems wherein controlled variations in temperature are necessary will become apparent.

Instruments based upon the measurement of acoustic velocity, upon absorption of radiation, and upon fluid density have been applied to the determination of uranium hexafluoride in binary mixtures. Since these methods provide only an average measurement of the physical property involved, they are not reliable for determining uranium hexafluoride in complex gas mixtures.

In a system where the uranium hexafluoride was contaminated with heavy fluorocarbons as well as light components, the aforementioned methods were tried unsuccessfully. An analyzer sensitive only to the uranium hexafluoride concentration was not in existence.

In another example, a gaseous diffusion system test loop facility may be equipped with a mass spectrometer for the detection of light contaminant gases in a uranium hexafluoride process system. Typically these light contaminants consist of $O_2$, $N_2$, and HF. These contaminants are preferably kept at a concentration below 1 mole percent. The mass spectrometer is effective in determining the presence of $O_2$ and $N_2$ but is unreliable in determining concentrations of HF. In the past the compressor itself in conjunction with the mass spectrometer has been found to be effective for determining the presence of HF in the recycling process system. That is, if no $O_2$ or $N_2$ is indicated by the mass spectrometer, yet the compressor does not develop the volume flow and head which is expected, there is assumed to be HF contamination. A remedy for this situation is to "sweep" or purge the recycling system with new inventory, thus recharging the compressor until no resultant change in compressor performance is noted.

This mode of operation is undesirable because small percentages of HF (less than 1%) may well go unnoticed since the effect on compressor performance would be small. However, when testing a compressor design with no previous history, even larger percentage of HF may go unnoticed. This method of dealing with HF contamination in the test loops is a tedious, time-consuming operation and is, therefore, costly as well as unreliable.

A prior art method for detecting HF has been the infra-red analyzer. This method was undesirable because the instrument did not lend itself readily to on-stream continuous operation in a process system.

It is an object, therefore, of the present invention to provide a method and apparatus for continuously determining the concentration of uranium hexafluoride or other condensable gas in a gaseous mixture, said method being independent of thermal lag, capable of a high degree of precision and readily adaptable for control purposes in a process system.

Applicants have as another object of their invention the provision of a method and apparatus for continuously measuring the concentration of a gas in a multicomponent gas stream which is independent of variations of impurities.

Other objects and advantages of our invention will appear from the following specification and accompanying drawings and the novel features thereof will be particularly pointed out in the annexed claims.

Figure 1:
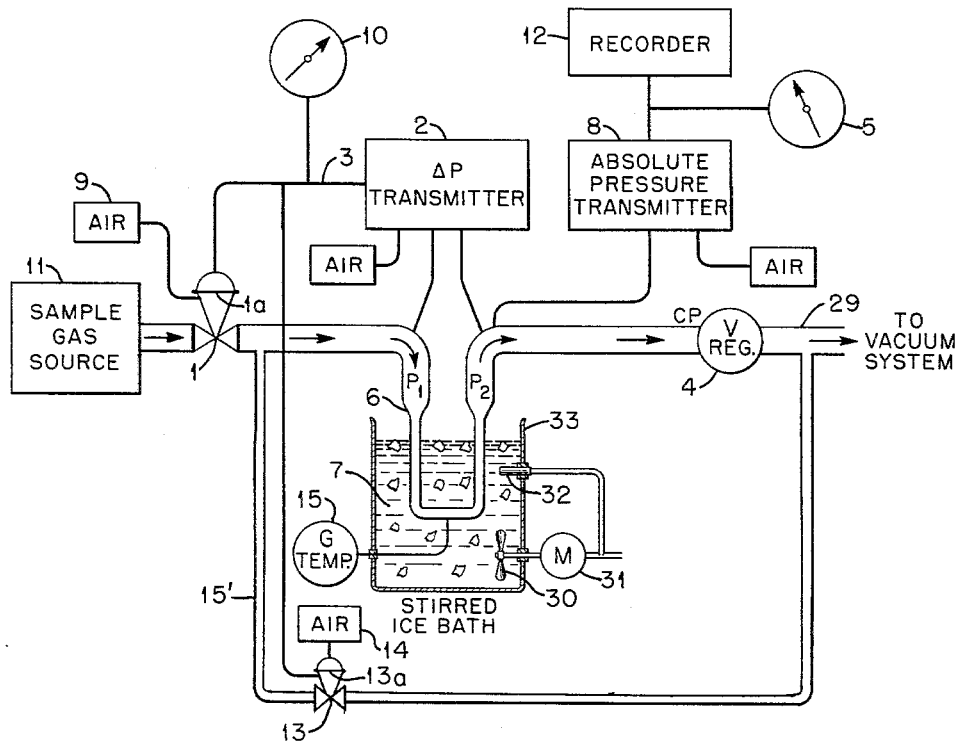
FIGURE 1 is a schematic of a preferred form of applicants' improved continuous gas analyzer.

The analyzer of FIGURE 1 depends upon the measurement of the total pressure required for condensation equilibrium between the sample gas and a condensed component at constant temperature conditions; thus, the partial pressure of the first condensable component "A" is held at its vapor pressure, which is a constant at a given fixed temperature. The fixed inverse relationship between mole concentration and total gas pressure is derived from the following equation:

$$\frac{\text{Partial pressure of } A}{\text{Total sample pressure}} \times 100 = \text{mole percent } A$$

where partial pressure of $A=K$ (constant, then $$\text{mole percent } A = \frac{K}{\text{Total sample pressure}} \times 100$$

Figure 2:
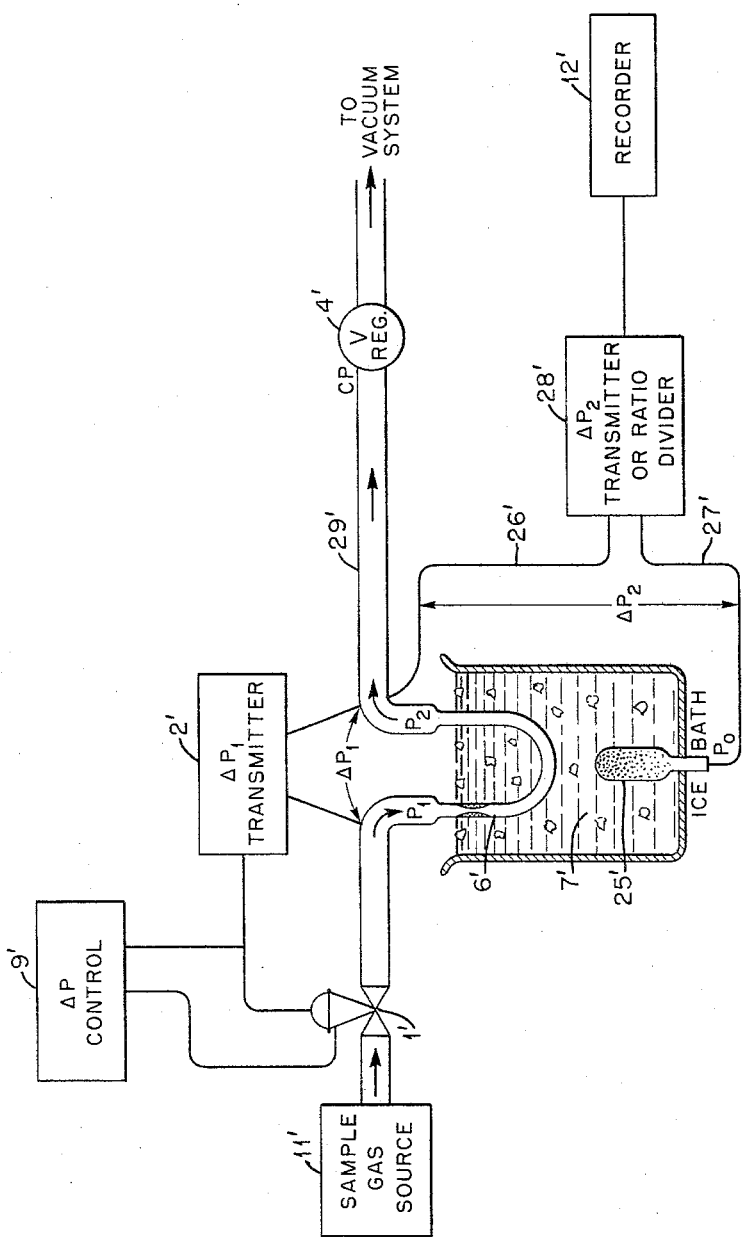
FIGURE 2 is a chart of sample pressure against mole percent component.

The relationship may be graphically illustrated as shown in FIG. 2; at 25% concentration of "A" the total gas pressure, which serves as the analytical signal, is twice that at 50% concentration, when the partial pressure of "A" is constant.

The system is comprised of five basic elements: The control valve 1 that causes the total gas pressure to oscillate, so as to cause the partial pressure of the analytically desirable component "A" to seek its vapor pressure; the element 2 which senses that the pressure of "A" has exceeded or become less than its vapor pressure; a means 3 to feed back the response from the sensing element to the control valve; a flow control 4 to limit the evacuation rate of the simple gas, so that it can attain pressures sufficient for condensation while permitting flows adequate for acceptable response; and the meter 5 to continuously measure the total pressure as the analytical signal.

As the sensing element, a differential pressure transmitter 2 is employed which utilizes the abrupt differential pressure changes caused by condensation within a cool restriction or capillary 6 maintained at constant temperature in vessel 33 by the cold bath 7 of ice or other medium by a stirrer 30 driven by motor 31 and controlled by thermostat 32 or other appropriate means, and schematically shown in FIG. 1. However, a suitable constant temperature bath is commercially available in Chemical Rubber Company Catalog, 1959, No. 400, which discloses a Fisher-Isotemperature bath designed to control temperature within .005° C. The pressure drop across the restriction is a function of the degree of condensation within the restriction 6. At temperatures below 64° C. gaseous uranium hexafluoride condenses directly to the solid form; the simplest restriction, a capillary, proved satisfactory for the sensing element.

The capillary type restriction has been applied only to the analysis of vapors which condense directly to the solid phase. For other applications, e.g., those involving liquid condensation, other embodiments may be preferred.

The transmitters 2 and 8 are conventional, and may be Taylor Instrument Co., Model #206 transmitters. They convert the measured pressure signals of the corrosive gas to amplified air pressure signals. The signal from the absolute pressure transmitter 8 is recorded as total gas pressure on pressure gauge 5. The air pressure signal from the differential pressure transmitter 2 is applied to the top of the inlet diaphragm-operated control valve 1, and regulated air pressure is applied from source 9 to the bottom of the diaphragm 1a; ΔP control settings are made by adjusting the pressure beneath the diaphragm, and the resultant pressure drops are indicated on pressure gauge 10.

The analyzer automatically adjusts the total pressure to maintain the partial pressure of the analytically desired component, such as $UF_6$, at its condensation pressure. Its operation may be explained as follows:

Sample gas passes through the system from source 11, which may take the form of a process line, at a variable flow rate established by the pressure $P_2$ and the resistance of the exit restriction 4, to the vacuum system (not shown) through exit conduit 29. The exit restriction is fixed so that the differential pressure developed at the open cool capillary is less than the control differential pressure desired (ca. 6 mm. Hg). Thus the inlet control valve 1 opens and the analyzer pressure approaches the sample supply pressure. If uranium hexafluoride is introduced, within the concentration range of the instrument, condensation of uranium hexafluoride partially plugs the cool capillary 6, causing the differential pressure across the capillary to rise above the control point and the control valve 1 to close. The system is then evacuated as the sample gas bleeds through the capillary 6; and when the total pressure drops below that required for condensation, evaporation occurs and the capillary deposit decreases, causing the differential pressure to drop and the control valve to open again. Pressure then gradually increases and the cycle is repeated.

This cycle operation has actualy been observed and recorded only at low flow rates. With sufficient flow, an equilibrium is reached and the cycling effect is negligible. The output signal of this continuous analyzer is a smooth line on a chart of the pressure recorder 12 of conventional type and can follow changes in condensable content of a gas stream with no significant overshoot or cycling.

It will be noticed that a second control valve 13 has been included in the system. Its purpose is to assist the inlet valve 1 in case of rapid changes in uranium hexafluoride concentration and to serve as a relief valve to prevent a complete plug in the cool restriction. This is accomplished by inserting it in bypass line 15' which extends around capillary 6 and exit valve 4. The output pressure from the transmitter 2 is applied to the bottom of the diaphragm 13a; a regulated air pressure, higher than that supplied to the inlet valve 1, is applied to the top from source 14. The need for this valve is marginal since it rarely becomes active; no incidents of complete plug have been encountered.

The detector capillary necessarily is colder than the rest of the system and for best operation it is preferable to cool only the center portion to minimize the possibility of condensation before or after the capillary. Copper and nickel capillaries, 2 to 4 inches long with internal diameters of 0.03, 0.05, and 0.065 inch have proven satisfactory. The smaller diameter and shorter capillaries are more sensitive and therefore were selected for studies at low concentrations.

In tests with uranium hexafluoride, a wet, stirred ice bath was conveniently used to provide a constant temperature of 0° C. The vapor pressure of uranium hexafluoride at 0° C. is 17.57 mm. g.

All components expected to come in contact with uranium hexafluoride or fluorine are preferably constructed of resistant metals such as copper, nickel, and Monel. All joints were silver soldered and fluorothene plastic valve seats were used.

In the operation described above, with the constriction maintained at a known selected temperature as indicated by temperature gauge 15, which may take any suitable form such as a thermocouple or thermometer, the selected component of the process gas mixture, i.e., $UF_6$, passing through the system, condenses in the capillary, partially blocking it. At this point the temperature at which condensation takes place is known, or can be ascertained from the thermometer or gauge 15. From vapor pressure tables for the condensable component the vapor pressure corresponding to that temperature can be obtained. Since the total pressure can be read on pressure gauge 5, the percent of component in the mixture is found by dividing the total pressure read at equilibrium into the known vapor pressure of the component taken from the tables. A commercially available ratio divider is used for continuously converting the pressure signal into percent condensable component.

Table I, which follows, presents performance data obtained with the apparatus shown in FIGURE 1 over a wide range of concentrations. The controlled temperature bath, of ice and ice water, was constant to ±0.025° C. according to thermocouple measurements, permitting analytical precision to about ±0.2 percent of the measured concentration.

*TABLE I.—Accuracy of condensation pressure analyzer, percent $UF_6$*

| By synthesis: | By analyzer |
|---|---|
| 100.0 | 100.0 |
| 77.0 | 76.6 |
| 65.3 | 64.8 |
| 53.0 | 52.7 |
| 44.8 | 44.6 |
| 37.9 | 38.1 |

As mentioned above, analytical errors are introduced by changes in the temperature of the condensation capillary; a fluctuation of ±0.1° C. at 0° C. will cause an error of ±0.8% of the analytical value.

While this invention has been described in connection with a $UF_6$ gas mixture contaminated with other gases such as $N_2$, $O_2$, and HF, it should be realized that other condensable gases could be substituted for $UF_6$ in the example.

Having thus described our invention, we claim:

1. A device for continually measuring the concentration of a readily condensable gas in a gaseous stream comprising, in combination, a line for continuous passage of gas with a condensable component, a condensing chamber fed by the line and provided with cooling means to condense a portion of said condensable gas at a selected partial pressure, means to maintain continuous flow of gas through said chamber, means to detect condensation of said gas, means coupled to and responsive to said detecting means to vary the total pressure within said chamber, and means to detect the lowest pressure at which said condensable gas will condense, said pressure being inversely proportional to the concentration of said condensable gas.

2. A device for continually measuring the concentration of a readily condensable gas in a gaseous stream comprising, in combination, a process line having a constriction therein, means to maintain said constriction at a selected temperature low enough to condense at least a portion of said condensable gas at a selected partial pressure, means to maintain flow of gas through said line, a control valve to vary the absolute pressure in said line responsive to a change in the pressure drop across said constriction, and means to detect the lowest absolute pressure of the gas in said line at which condensation will occur, said pressure being inversely proportional to the concentration of said condensable gas, and means for coupling the detecting means to the control valve to control the operation thereof.

3. A system for continuously determining the concentration of a condensable component of a gas stream comprising a line for transporting the gas toward a vacuum system, a control valve for regulating the flow of a gaseous mixture, a sensing element located downstream from the control valve for detecting the condensation of a selected component of the mixture, means for cooling the line at the position of the sensing element to a predetermined temperature to condense the desired component and alter the gas pressure therein, a flow control positioned downstream from the sensing element to limit the rate of evacuation therefrom, means coupling the sensing element to the control valve and responsive to a pressure drop at the sensing element for controlling the operation of the upstream control valve to produce condensation equilibrium, and a pressure gauge adjacent the sensing element for indicating total pressure.

4. A system for continuously measuring the concentration of a condensable component of a gas stream comprising a channel for the passage of a gas stream, a control valve for controlling the inflow of a gas stream, a constriction located downstream from the control valve, means for maintaining the temperature of the constriction at a predetermined value to condense a selected component of the stream and alter the pressure therein for limiting the flow of said stream, a flow control positioned downstream from the constriction to limit the rate of evacuation therefrom, and a differential pressure transmitter coupled across the constriction and responsive to a pressure drop thereacross to regulate the upstream control valve and change the gas inflow to produce equilibrium, and a pressure-responsive device downstream from the constriction for indicating pressure.

References Cited by the Examiner
UNITED STATES PATENTS 2,836,057　5/1958　Johnson et al. _____ 73—29
2,866,339　12/1958　Rhodes et al. _____ 73—29 X RICHARD C. QUEISSER, *Primary Examiner.*

CARL D. QUARFORTH, *Examiner.*

J. D. VOIGHT, *Assistant Examiner.*